(12) United States Patent
Guenther et al.

(10) Patent No.: US 9,193,043 B2
(45) Date of Patent: Nov. 24, 2015

(54) DEVICE FOR A USER TO SECURE A WORKPIECE

(71) Applicant: Hilti Aktiengesellschaft, Schaan (LI)

(72) Inventors: Joachim Guenther, Kaufering (DE);
Dragomir Ljubojevic, St. Gallen (CH);
Bert Melzer, Emdem (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/322,492

(22) Filed: Jul. 2, 2014

(65) Prior Publication Data

US 2014/0327200 A1    Nov. 6, 2014

Related U.S. Application Data

(62) Division of application No. 13/414,227, filed on Mar. 7, 2012, now Pat. No. 8,814,152.

(30) Foreign Application Priority Data

Apr. 26, 2011   (DE) .......................... 10 2011 017 506

(51) Int. Cl.
| | |
|---|---|
| *B25B 1/22* | (2006.01) |
| *B25B 11/00* | (2006.01) |
| *B27B 17/00* | (2006.01) |
| *B23Q 3/00* | (2006.01) |

(52) U.S. Cl.
CPC . *B25B 11/00* (2013.01); *B23Q 3/00* (2013.01); *B27B 17/00* (2013.01)

(58) Field of Classification Search
USPC .......................................................... 269/71
See application file for complete search history.

(56) References Cited

U.S. PATENT DOCUMENTS

| | | | | |
|---|---|---|---|---|
| 3,555,954 A * | 1/1971 | Payne et al. | ................ | 83/699.51 |
| 4,836,518 A * | 6/1989 | Janutta | ............. | 269/43 |
| 4,875,667 A * | 10/1989 | Schafer | .......... | 269/91 |
| 5,127,647 A * | 7/1992 | Wilkinson | ...... | 482/52 |
| 5,613,922 A * | 3/1997 | Hsiang | ......... | 473/435 |
| 5,683,331 A * | 11/1997 | Dalebout | ........ | 482/52 |
| 5,950,267 A * | 9/1999 | Ricci, Jr. | ........ | 14/71.1 |
| 6,360,797 B1 * | 3/2002 | Brazell et al. | ............. | 144/286.1 |
| 6,531,683 B1 * | 3/2003 | Lawrence | ................ | 219/125.1 |
| 6,622,906 B1 * | 9/2003 | Kushibe | ....... | 228/212 |
| 7,007,771 B2 * | 3/2006 | Rawlings et al. | ............ | 182/33 |
| 7,069,644 B2 * | 7/2006 | Pellerin et al. | ................. | 29/802 |
| 7,094,012 B1 * | 8/2006 | Bang et al. | .................... | 409/221 |
| 7,264,215 B2 * | 9/2007 | Niehoff | ......... | 248/371 |
| 7,361,123 B1 * | 4/2008 | Krull | ......... | 482/52 |
| 7,491,022 B2 * | 2/2009 | Kato et al. | ................. | 409/221 |
| 7,631,847 B2 * | 12/2009 | Harrison et al. | .......... | 248/316.1 |
| 7,669,345 B2 * | 3/2010 | Cheng | ............ | 33/568 |

(Continued)

FOREIGN PATENT DOCUMENTS

| | | |
|---|---|---|
| DE | 934 723 | 11/1955 |
| DE | 30 31 934 | 5/1982 |
| FR | 2 775 629 | 9/1999 |

*Primary Examiner* — Lee D Wilson
*Assistant Examiner* — Alvin Grant
(74) *Attorney, Agent, or Firm* — Davidson, Davidson & Kappel, LLC

(57) ABSTRACT

A device (1) for a user to secure a workpiece (2) that is positioned on a substrate (3) during the processing of the workpiece (2) with a hand-held power tool. A stepping element (4) has a stepping surface (10) via which the user applies a holding force, and that also has a placement surface (11) for placing the device (1) onto the workpiece (2).

20 Claims, 6 Drawing Sheets

(56) References Cited

U.S. PATENT DOCUMENTS

| | | | |
|---|---|---|---|
| 7,954,219 B2 * | 6/2011 | Seddon et al. | 29/281 |
| D644,402 S * | 8/2011 | Shoup et al. | D34/32 |
| 8,056,876 B2 * | 11/2011 | Yu et al. | 248/316.5 |
| 8,113,497 B2 * | 2/2012 | Kellerson | 269/45 |
| 8,118,291 B2 * | 2/2012 | Nuchter et al. | 269/71 |
| 8,123,206 B2 * | 2/2012 | Hsu | 269/289 R |
| 8,123,427 B2 * | 2/2012 | Vogt | 403/90 |
| 8,191,878 B2 * | 6/2012 | Pedersen et al. | 269/71 |
| 8,231,087 B1 * | 7/2012 | Giordano, Jr. | 248/166 |
| 8,376,341 B2 * | 2/2013 | Kocher | 269/95 |

\* cited by examiner

DEVICE FOR A USER TO SECURE A WORKPIECE

This is a Divisional of U.S. patent application Ser. No. 13/414,227, filed Mar. 7, 2012 and claims the benefit of German Patent Application DE 10 2011 017506.7, filed Apr. 26, 2011, both applications are hereby incorporated by reference herein.

The invention relates to a device for a user to secure a workpiece.

BACKGROUND

Hand-held power tools are used to cut elongated workpieces to length. The term "hand-held power tools" refers below to power tools such as, for example, angle grinders and chainsaws that an user holds in his hands during the work. Electric as well as gasoline-powered hand-held power tools are known. The tool selected depends, among other things, on the material of the workpiece that is to be cut to length. Chainsaws are used mainly for tree trunks and wooden beams, whereas angle grinders are used primarily for stone curbs and steel pipes.

In actual practice, the workpieces that are to be cut to length are not clamped during the work, but rather are secured by the user who puts his foot onto the top of the workpiece. This securing technique entails the risk of foot injuries since the foot is close to the cutting site and thus to the moving work tool. The risk of foot injuries is especially high at the beginning and end of the cutting procedure since the work tool can move in an uncontrolled manner.

SUMMARY OF THE INVENTION

It is an object of the present invention is to reduce the risk of foot injuries when elongated workpieces are cut to length by means of hand-held power tools.

The present invention provides a stepping element that has a stepping surface via which the user applies a holding force, and that also has a placement surface for placing the device onto the workpiece. The stepping surface ensures that the holding force is applied uniformly to the workpiece. Moreover, it reduces the risk that the user's foot might slip during the work. The stepping surface is preferably made of a non-skid material or provided with a coating of a non-skid material. The use of a non-skid material reduces the risk that the user's foot will slip off the stepping surface during the securing procedure.

Preferably, the stepping element is connected via a connecting element to a retaining element that has a contact surface for the securing device to make contact with the workpiece. The retaining element ensures that the securing device is in contact with the workpiece, not only via the placement surface of the stepping element, but also via another contact surface. Thanks to the additional contact surface on the workpiece, the workpiece that is to be secured is prevented from rolling or slipping away under the securing device when the holding force is applied.

Especially preferably, the retaining element is configured so as to be adjustable relative to the stepping element. Here, the position of the contact surface of the retaining element and/or the angle between the stepping element and the retaining element are adjustable. Since the retaining element is adjustable, the securing device can be adapted to different workpieces.

In a preferred embodiment, the stepping element is connected via a connecting element to a support element with which the device can rest on the substrate. The support element ensures that the securing device is anchored on the substrate and the workpiece that is to be secured is prevented from moving or slipping away.

The support element here consists especially preferably of a first section facing the stepping element and of a second section facing the substrate, whereby the first and second sections are adjustable relative to each other using a length adjustment means. Thanks to this length adjustment, the securing device can be adapted to different workpieces. Moreover, using the length adjustment means, the stepping element can be aligned in such a way that the stepping surface is slanted by an inclination angle relative to the horizontal plane. The inclination of the stepping surface improves the ergonomics for the user. Inclination angles of about 5° to 20° are ergonomically advantageous.

In a preferred embodiment, the stepping element and the support element are each arranged at an angle of 100° to 120° relative to the retaining element. This embodiment is especially well-suited for securing workpieces having a circular or rounded cross section. Here, the length adjustment means of the support element is used to adapt the securing device to different diameters and to set the inclination angle of the stepping surface.

In an alternative preferred embodiment, the stepping element and the support element are arranged at an angle of 90° relative to the retaining element, and the stepping surface is slanted by an inclination angle of about 5° to 20° relative to the placement surface. This embodiment is especially well-suited for securing workpieces having a rectangular cross section. Here, the securing device is adapted to different heights and widths of the workpieces using the length adjustment means of the support element and by means of the adjustability of the retaining element.

In a preferred embodiment, a protective guard is provided that is connected to the stepping element and that is arranged on the side of the stepping element associated with the hand-held power tool during the work. The protective guard reduces the risk of foot injuries for the user since the working area of the hand-held power tool is shielded by the protective guard.

In a first variant, the stepping element and the protective guard are non-detachably connected to each other. The non-detachable connection reduces the possibility of improper use by the user. Moreover, This ensures that the user will not dismantle the protective guard. Preferably, a protective guard is provided on both sides of the stepping element so that the securing device can be used by left-handed as well as right-handed persons.

In a second variant, the stepping element and the protective guard are detachably connected to each other, whereby the protective guard can be connected to the stepping element on the right-hand and/or on the left-hand side of the stepping element. The detachable connection has the advantage that the securing device can be used by left-handed as well as right-handed persons, and the user can arrange the protective guard on the side of the stepping element associated with the hand-held power tool during the work.

BRIEF DESCRIPTION OF THE DRAWINGS

Embodiments of the invention will be described below on the basis of the drawing. The drawing does not necessarily depict the embodiments true-to-scale, but rather, the drawing is presented in schematic and/or slightly distorted form whenever necessary for the sake of clarity. Regarding additions to the teaching that can be gleaned directly from the drawing, reference is hereby made to the pertinent state of the art. In this context, it should be taken into account that a wide array of modifications and changes pertaining to the shape and the detail of an embodiment can be made, without deviating from the general idea of the invention. The features of the invention disclosed in the description, in the drawing as well as in the claims, either on their own or in any desired combination, can be essential for the refinement of the invention. Moreover, all combinations of at least two of the features disclosed in the description, in the drawing and/or in the claims fall within the scope of the invention. The general idea of the invention is not limited to the exact shape or details of the preferred embodiment shown and described below, nor is it limited to an object that would be restricted in comparison to the subject matter claimed in the claims. Regarding the dimensional ranges given, values that fall within the cited limits can also be disclosed as limit values and can be employed and claimed as desired. For the sake of simplicity, the same reference numerals will be used below for identical or similar parts or for parts having an identical or similar function.

The following is shown.

DETAILED DESCRIPTION

Figure 1A:
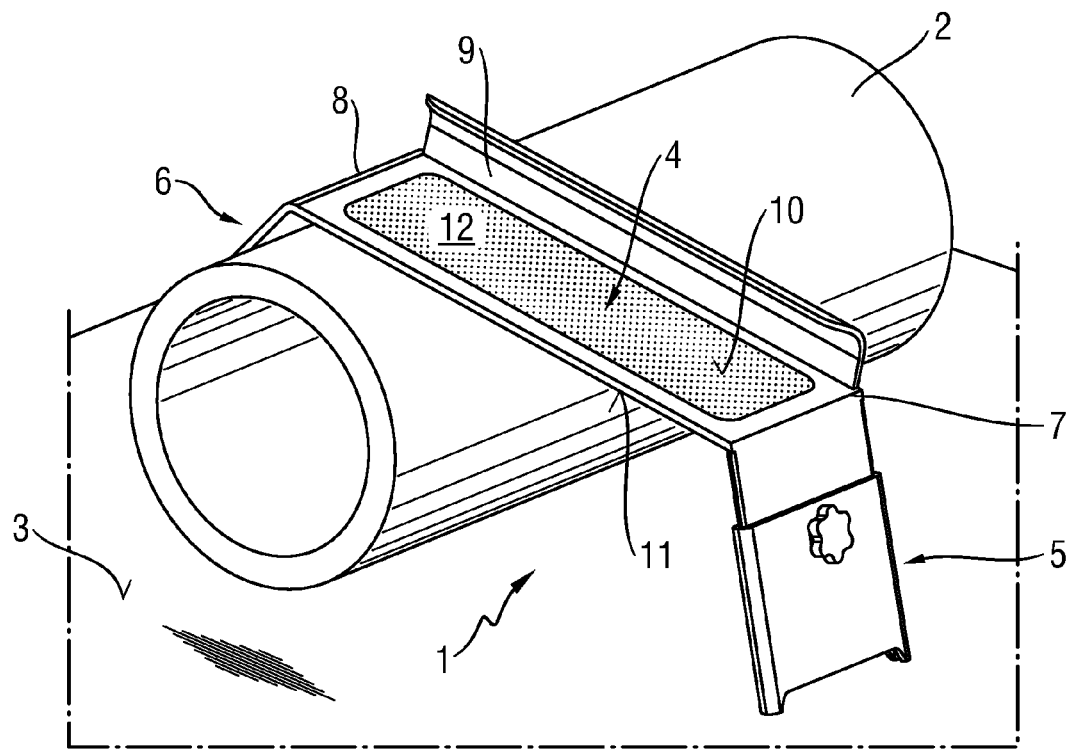
FIGS. 1A-C a first embodiment of a securing device according to the invention during the securing procedure of a tubular workpiece on a substrate, comprising a stepping element, a support element and a retaining element (FIG. 1A) as well as, in an enlarged view without the workpiece that is to be secured, in a front view (FIG. 1B) and in a rear view (FIG. 1C) of the support element.
Figure 1B:
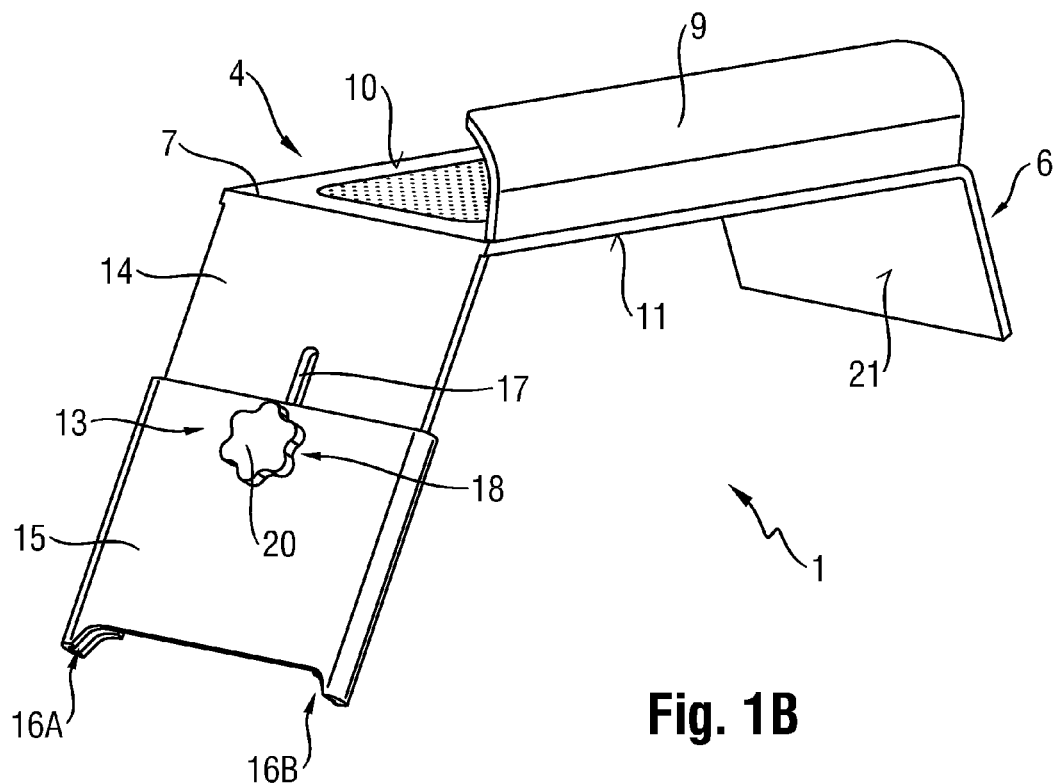
Figure 1C:
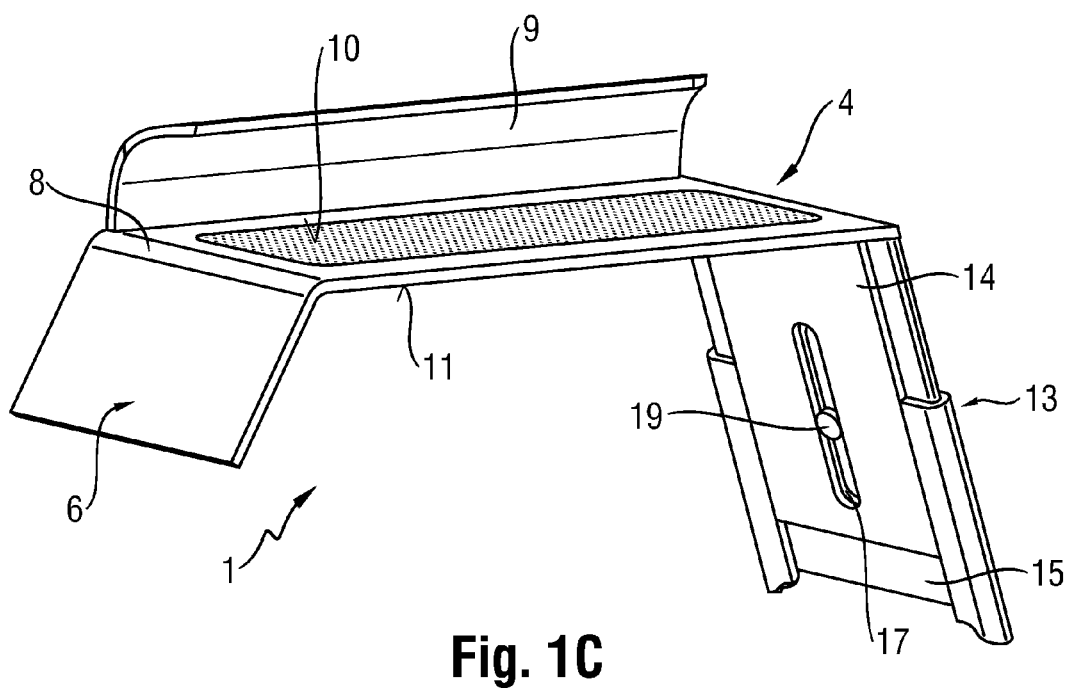

FIGS. 1A-C show a first embodiment of a device 1 according to the invention for securing a workpiece on a substrate while an user is working the workpiece with a hand-held power tool.

FIG. 1A shows the securing device 1 during the securing procedure of a tubular workpiece 2 on a substrate 3. In the case of workpieces with a circular or rounded cross section, there is a risk that the workpiece will roll away on the substrate during the work. The securing device 1 has the task of preventing the workpieces 2 from rolling away or moving on the substrate 3.

The securing device 1 includes a stepping element 4, a support element 5 and a retaining element 6. Here, the stepping element 4 and the support element 5 are connected to each other by a first connecting element 7, and the stepping element 4 and the retaining element 6 are connected to each other by a second connecting element 8.

In order to protect the foot of the user during the work, the securing device 1 has a protective guard 9 that is connected to the stepping element 4 and that is arranged on the side of the stepping element 4 associated with the hand-held power tool during the work. The cut is made on the side of the protective guard 9, so that the securing device 1 is suitable for a right-handed person and not suitable for a left-handed person. In order for the securing device 1 to also be used by left-handed persons, a protective guard 9 can be provided, for example, on both sides of the stepping element 4.

The stepping element 4 has a stepping surface 10 via which the user applies a holding force to the securing device, and, opposite from the stepping surface 10, a placement surface 11 for placing the securing device 1 onto the workpiece 2. The stepping surface 10 is provided with a coating 12 made of a non-skid material or, as an alternative, it is made of a non-skid material.

FIGS. 1B and 1C show the securing device 1 in a front view (FIG. 1B) and in a rear view (FIG. 1C) on the support element 5, without the tubular workpiece that is to be secured. The support element 5 is configured so as to be adjustable between a minimum and a maximum length using a length adjustment means 13, and it consists of a first section 14 facing the stepping element 4 and of a second section 15 with which the securing device 1 rests on the substrate 3. The second section 15 has a first foot 16A and a second foot 16B on the side facing the substrate 3. Depending on the substrate 3, the second section 15 can have different feet 16A, 16B in order to firmly secure the securing device 1 on the substrate 3.

The first and second sections 14, 15 of the support element 5 are adjustable relative to each other. In the first section 14, there is a slot 17 in which a fastening means 18 is located. The fastening means 18 consists of a screw 19 and a nut 20. When the nut 20 is tightened, the first and second sections 14, 15 are firmly connected to each other, whereas when the nut 20 is loose, the second section 15 is adjustable.

The retaining element 6 serves to firmly secure the workpiece 2 during the work and to prevent the workpiece 2 from slipping away. The retaining element 6 has a contact surface 21 with which the securing device 1 rests on the workpiece 2. Tubular workpieces are firmly secured via the placement surface 11 of the stepping element 4 and via the contact surface 21 of the retaining element 6.

In the embodiment of the securing device 1 shown, the stepping element 4, the first section 14 of the support element 5, the retaining element 6 and the protective guard 9 are configured monolithically as a metal bracket without adjustment possibilities. The stepping element 4, the first section 14 of the support element 5 and the retaining element 6 are arranged relative to each other in such a way that the securing device 1 is suitable for securing a prescribed spectrum of tubular workpieces. The securing device 1 is adapted to different pipe diameters using the length adjustment means 13 of the support element 5.

Figure 2A:
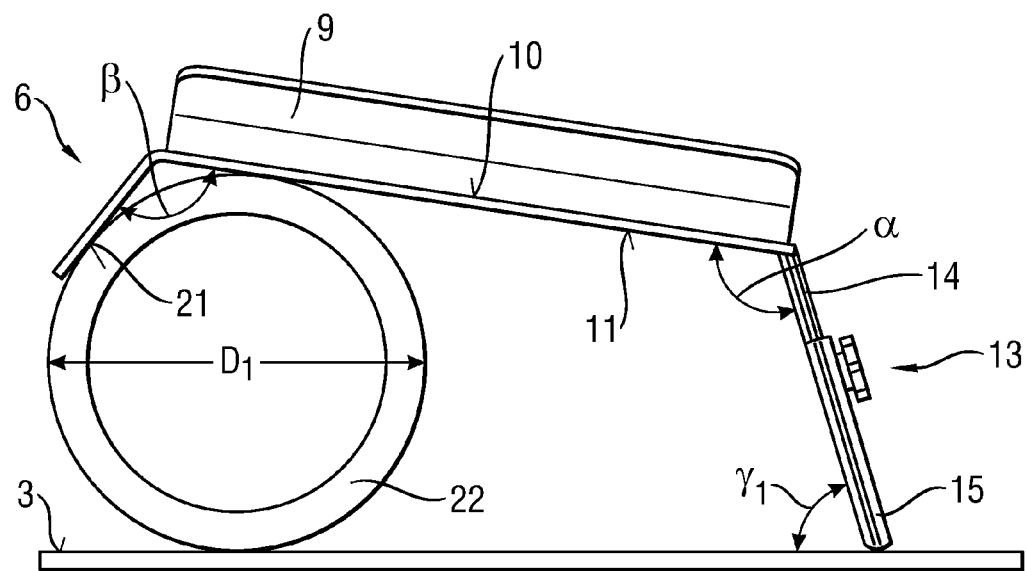
FIGS. 2A, B the securing device of FIGS. 1A-C in a side view during the securing procedure of a first tubular workpiece having a first pipe diameter (FIG. 2A) and of a second tubular workpiece having a second, larger pipe diameter (FIG. 2B)
Figure 2B:
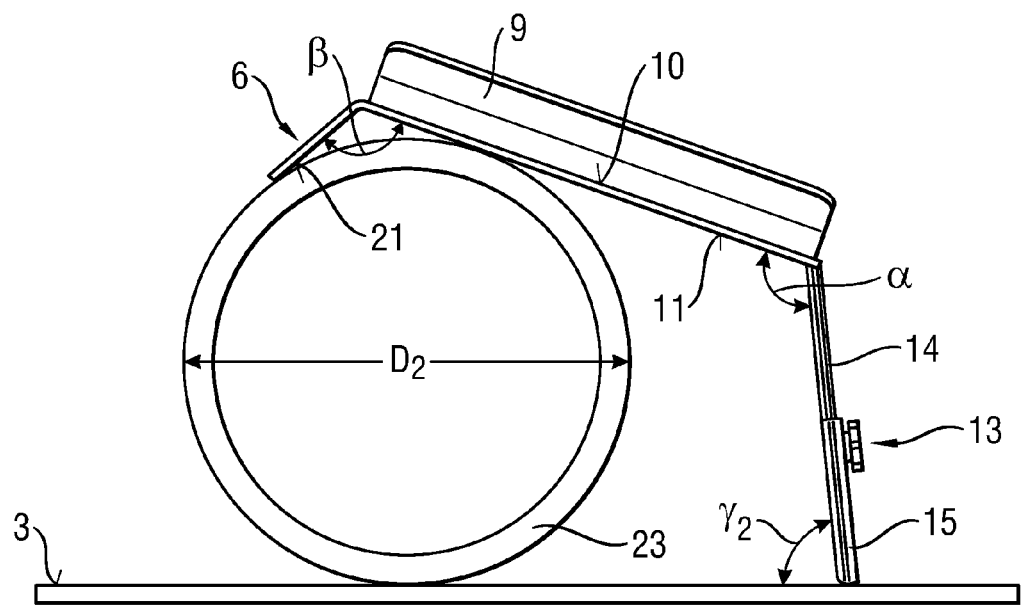

FIGS. 2A, B show the securing device 1 in a side view during the processing of a first tubular workpiece 22 having a first pipe diameter $D_1$ of 30 cm (FIG. 2A) and of a second tubular workpiece 23 having a second pipe diameter $D_2$ of 50 cm (FIG. 2B).

In order to be able to work tubular workpieces having a pipe diameter of about 30 cm to 50 cm, securing devices are suitable that have, for example, an angle α of about 115° between the stepping element 4 and the support element 5, and an angle β of about 120° between the stepping element 4 and the retaining element 6.

Since the angles α, β between the stepping element 4 and the support element 5, and between the stepping element 4 and the retaining element 6, are not adjustable, the securing device 1 is adapted to the pipes 22, 23 using the length adjustment means 13. The length of the support element 5 is set in such a way that the stepping element 4 and the retaining element 6 each lie against the pipe 22, 23, and the securing device 1 is supported on the substrate 3 via the feet 16A, 16B.

It is ergonomically advantageous if the stepping surface 10 is not arranged horizontally but rather at an inclination angle relative to the horizontal plane. The inclination of the stepping surface 10 improves the ergonomics for the user during the work. Angles of about 5° to 20° have proven to be ergonomically advantageous. The user can set the inclination angle of the stepping surface 10 using the length adjustment means 13 of the support element 5 and can adapt it to his needs.

The inclination of the stepping surface 10 is set differently when the workpieces 22, 23 are secured. This can be seen in the fact that the angle γ between the support element 5 and the substrate 3 is different. When the first workpiece 22 is secured, the angle $\gamma_1$ is smaller than the angle $\gamma_2$ when the second workpiece 23 is secured.

Figure 3A:
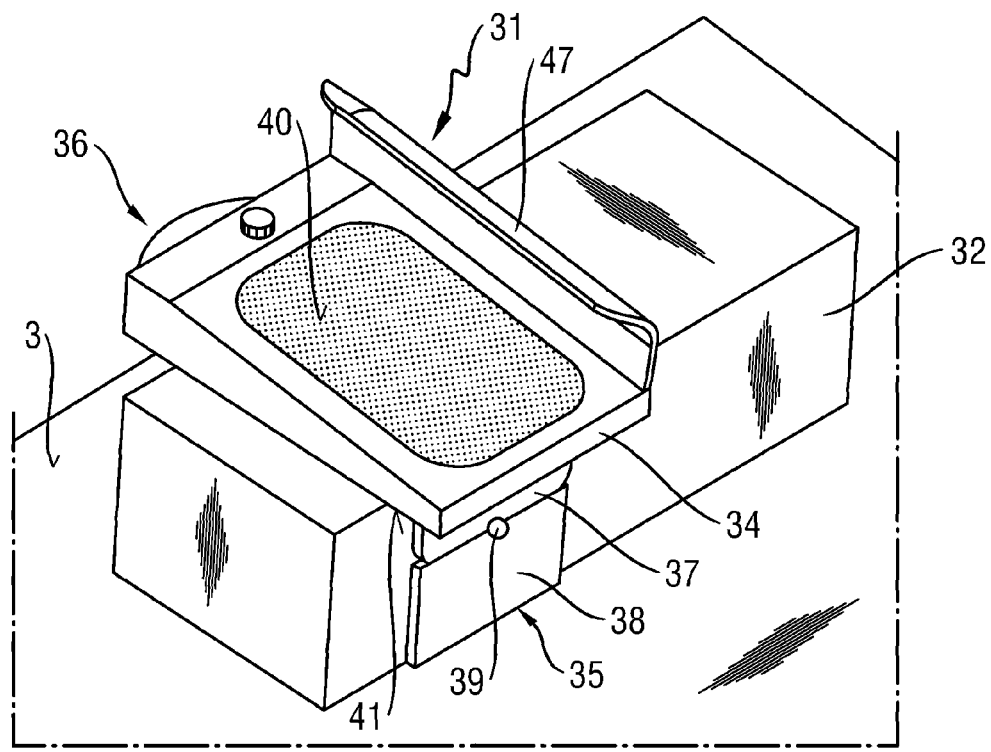
FIGS. 3A, B a second embodiment of a securing device according to the invention during the securing procedure of a rectangular workpiece on a substrate (FIG. 3A) and in an enlarged view without the workpiece that is to be secured (FIG. 3B)

FIGS. 3A, B show a second embodiment of a device 31 according to the invention for securing a workpiece on the substrate 3 during the work by a user.

FIG. 3A shows the securing device 31 during the securing procedure of a rectangular workpiece 32 that is configured in the form of a porous concrete stone. In the case of rectangular workpieces, thanks to the larger placement surface on the substrate 3, there is less risk that the workpiece will roll away on the substrate 3 than is the case with workpieces having a circular or rounded cross section. Nevertheless, there is risk of injury to the user, especially at the beginning and end of the cutting procedure, due to uncontrolled movements of the work tool. The lighter the workpiece, the greater the risk that the workpiece will slip away on the substrate during the work.

The securing device 31 consists of a stepping element 34, a support element 35 and a retaining element 36. In order to be able to process workpieces 32 having different heights and widths, the support element 35 and the retaining element 36 are configured so as to be adjustable. The support element 35 consists of a first and a second section 37, 38 that are adjustable relative to each other using a length adjustment means 39. The securing device 31 is adapted to the height of the workpiece 32 by means of the adjustable length of the support element 35.

Like the stepping element 4 of the securing device 1, the stepping element 34 has a stepping surface 40 and a placement surface 41. The stepping surface 40 and the placement surface 41, however, are not arranged parallel to each other, but rather the stepping surface 40 is slanted relative to the placement surface 41 by an inclination angle. The inclination of the stepping surface 40 improves the ergonomics for the user during the securing procedure. Inclination angles of about 5° to 20° have proven to be ergonomically advantageous.

Figure 3B:
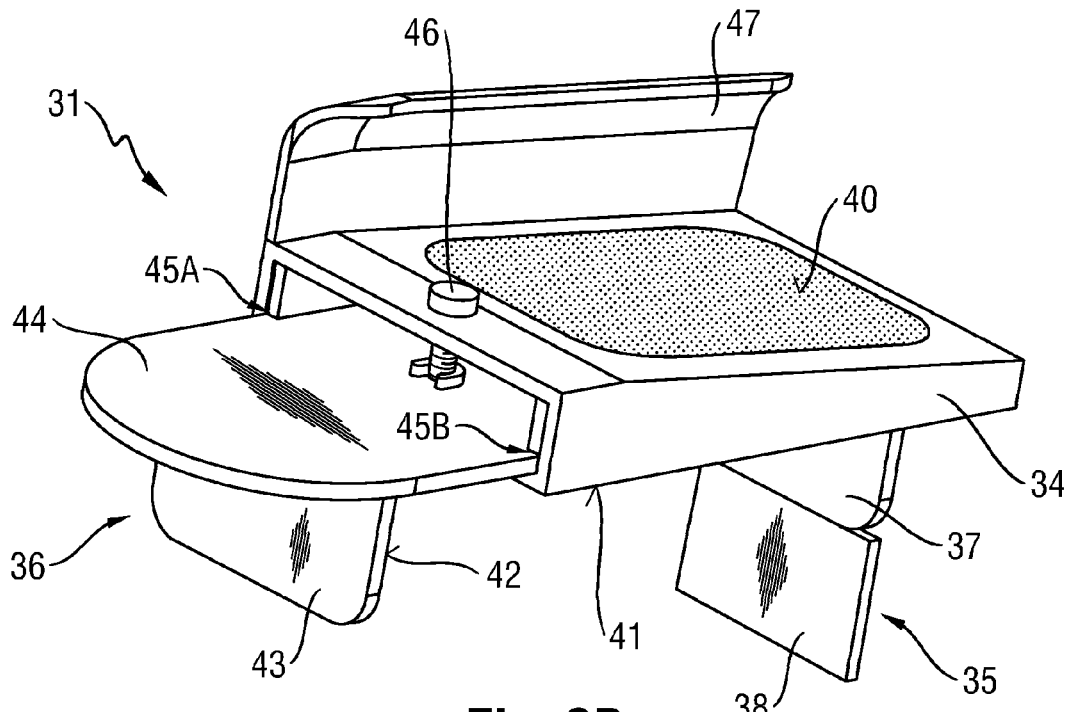

FIG. 3B shows the securing device 31 in an enlarged, three-dimensional view of the retaining element 38 without the rectangular workpiece 32 that is to be secured. The retaining element 36 ensures that the securing device 31 is in contact with the workpiece 32, not only via the placement surface 41 of the stepping element 34, but also via another contact surface 42. The contact surface 42 is oriented at an angle of 90° relative to the placement surface 41 of the stepping element 34.

The retaining element 36 includes a contact element 43 having the contact surface 42 and a sliding element 44. The sliding element 44 runs in two guide grooves 45A, 45B that are fastened between the stepping surface 40 and the placement surface 41 of the stepping element 34. The position of the sliding element 44 can be locked on the stepping element 34 or relative to the stepping element 34 by means of a locking device 46.

The securing device 31 is adapted to the width of the workpiece 32 on the basis of the adjustable position of the contact surface 42. The dimensions of the support element 35 and of the retaining element 36 are selected in such a way that the securing device 31 is suitable for a prescribed spectrum of rectangular workpieces 32. In order to be able to use the securing device 31 to secure four-sided workpieces that do not have a rectangular cross section, the adjustment means of the retaining element 36 can be augmented by an angle setting means.

The securing device 31 has a protective guard 47 that is detachably connected to the stepping element 34 and that, in the embodiment shown in FIG. 3A, is arranged on the side of the stepping element 34 associated with the hand-held power tool during the work. The protective guard 47 is connected to the stepping element 34, for example, via a screwed connection and it can be screwed onto both sides of the stepping element 34. Before using the securing device 31, the user can adapt it to a left-handed or right-handed person.

Figure 4A:
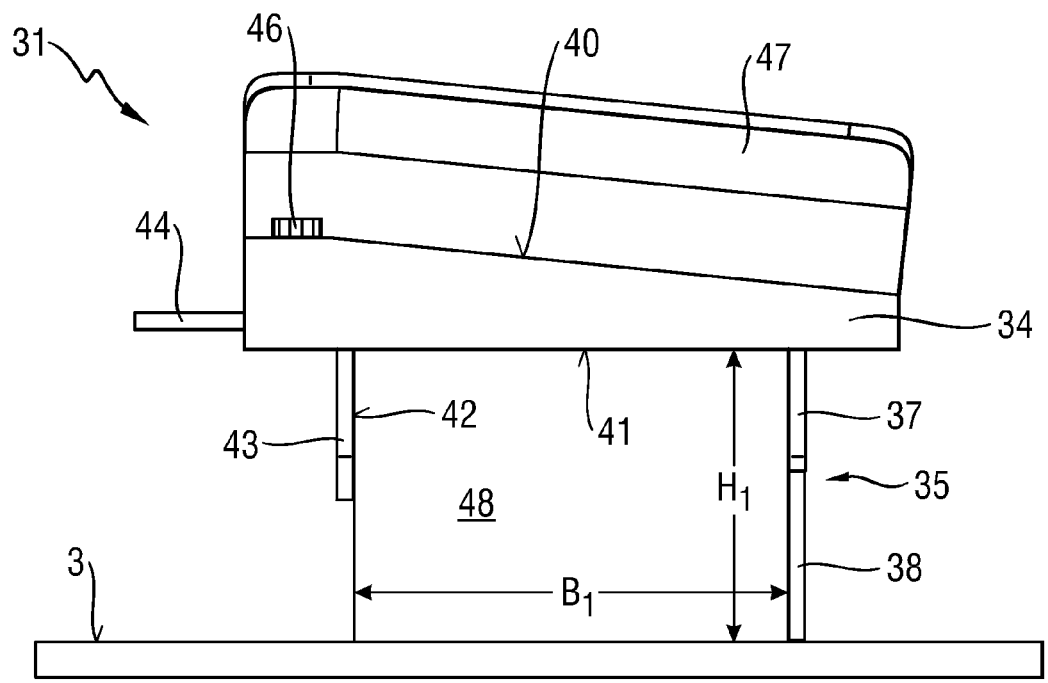
FIGS. 4A, B the securing device of FIGS. 3A, B in a side view during the securing procedure of a rectangular workpiece having a first height and width (FIG. 4A) and of a second rectangular workpiece having a second height and width (FIG. 4B)
Figure 4B:
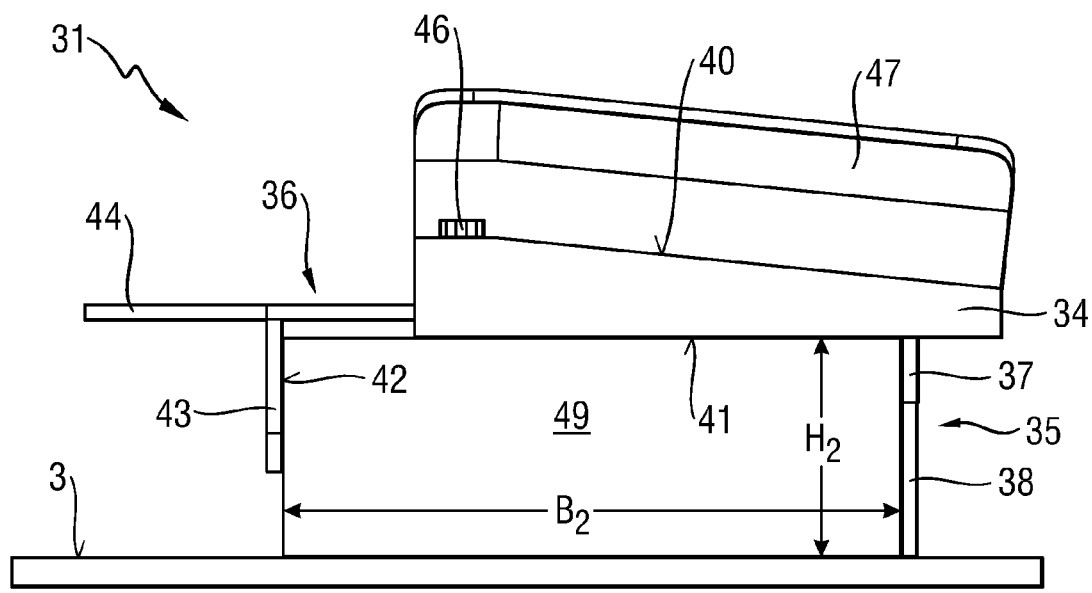

FIGS. 4A, B show the securing device 31 in a side view during the processing of a first rectangular workpiece 48 having a first height $H_1$ and a first width $B_1$ (FIG. 4A) and of a second rectangular workpiece 49 having a second height $H_2$ and a second width $B_2$ (FIG. 4B). Here, the first workpiece 48 is higher than the second workpiece 49 ($H_1 > H_2$), and the second workpiece 49 is wider than the first workpiece 48 ($B_1 > B_2$).

The length of the support element 35 is set in such a way that the placement surface 41 of the stepping element 34 rests on the workpiece 48, 49, and the securing device 31 is supported on the substrate 3 via the support element 35. The position of the retaining element 36 is set in such a way that the contact surface 42 rests on the workpiece 48, 49. Thanks to the retaining element 36, the workpiece 48, 49 that is to be secured is prevented from moving or slipping away under the stepping element 34 when the holding force is applied.

The securing device 31 is suitable for workpieces having a height of up to about 50 cm. Higher workpieces are not suitable for this securing technique since the height at which the stepping surface 40 is located does not allow the user to work ergonomically.

Figure 5:
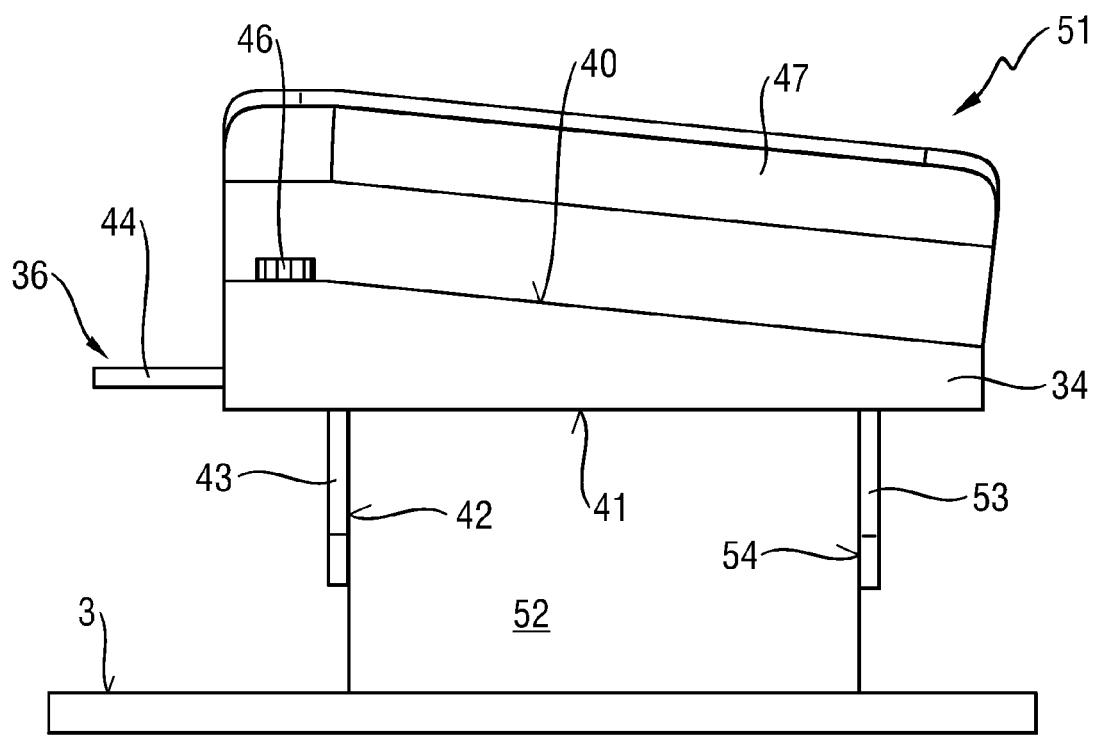
FIG. 5 a third embodiment of a securing device according to the invention during the securing procedure of a heavy, rectangular workpiece.

FIG. 5 shows a third embodiment of a device 51 according to the invention for securing a workpiece 52 on the substrate 3. In the case of heavy workpieces such as, for example, edge stones for curbs, there is very little risk that the workpiece 52 will slip away during the work since it is very heavy. In this case, there is no need to support and anchor the securing device 51 on the substrate 3. The configuration of the support element of the securing device 51 differs from that of the securing device 31.

The securing device 51 consists of the stepping element 34, the retaining element 36 and another contact element 53 having another contact surface 54. In order to be able to process workpieces of different widths, the retaining element 36 is configured so as to be adjustable.

The workpiece 52 is clamped between the contact surface 42 of the retaining element 36 and the contact surface 54 of the contact element 53. Here, the term "clamped" means that there is as little leeway as possible between the contact surfaces 42, 54 and the workpiece 52. This arrangement prevents the securing device 51 from slipping away due to uncontrolled movements of the work tool relative to the workpiece 52 during the work.

What is claimed is:

1. A device for a user to secure a workpiece positioned on a substrate during processing of the workpiece with a hand-held power tool, the device having a front, a left, a right and a rear with respect to the user, the device comprising:
   a stepping element having a stepping surface, the user applying a holding force via the stepping surface; and
   a placement surface for placing the device onto the workpiece, the placement surface having free edges at the left and right so as to permit the workpiece to extend beyond the placement surface when in contact; and
   an adjustable support element connected to the stepping element, the device restable via the support element on the substrate when the placement surface is on the workpiece.

2. The device as recited in claim 1 wherein the support element includes a first section closer to the stepping element and a second section further away from the stepping element, the first and second sections adjustable relative to each other using a length adjuster.

3. The device as recited in claim 1 wherein the stepping surface is slanted by an inclination angle of 5° to 20° relative to the placement surface.

4. The device as recited in claim 1 further comprising a protective guard connected to the stepping element and extending upwardly away from the placement surface and arranged on a side of the stepping element associated with the hand-held power tool during the processing.

5. The device as recited in claim 4 wherein the stepping element and the protective guard are non-detachably connected to each other.

6. The device as recited in claim 4 wherein the stepping element and the protective guard are detachably connected to each other, the protective guard connectable to the stepping element on either a right or on a left side of the stepping element relative to the processing.

7. The device as recited in claim 1 further comprising a retaining element adjustable relative to the support element and separated by the placement surface.

8. The device as recited in claim 7 wherein the retaining element includes a contact surface and a sliding element.

9. The device as recited in claim 8 wherein the retaining element further includes a locking element for locking a position of the sliding element.

10. A device for a user to secure a workpiece positioned on a substrate during processing of the workpiece with a hand-held power tool, the device having a front, a left, a right and a rear with respect to the user, the device comprising:
    a stepping element having a stepping surface, the user applying a holding force via the stepping surface;
    a placement surface for placing the device onto the workpiece, the placement surface having free edges at the left and right so as to permit the workpiece to extend beyond the placement surface when in contact;
    a support element connected to the stepping element; and
    a retaining element adjustable relative to the support element and separated by the placement surface.

11. The device as recited in claim 10 wherein the support element includes a first section closer to the stepping element and a second section further away from the stepping element, the first and second sections adjustable relative to each other using a length adjuster.

12. The device as recited in claim 10 wherein the stepping surface is slanted by an inclination angle of 5° to 20° relative to the placement surface.

13. The device as recited in claim 10 further comprising a protective guard connected to the stepping element, the retaining element extending downwardly from the stepping element and the protective guard extending upwardly from the stepping element and arranged on a side of the stepping element associated with the hand-held power tool during the processing.

14. The device as recited in claim 13 wherein the stepping element and the protective guard are non-detachably connected to each other.

15. The device as recited in claim 13 wherein the stepping element and the protective guard are detachably connected to each other, the protective guard connectable to the stepping element on either a right or on a left side of the stepping element relative to the processing.

16. The device as recited in claim 10 wherein the retaining element includes a contact surface and a sliding element.

17. The device as recited in claim 16 wherein the retaining element further includes a locking element for locking a position of the sliding element.

18. The device as recited in the claim 16 wherein the contact surface is at 90° to the placement surface.

19. The device as recited in claim 18 wherein the stepping surface is slanted by an inclination angle of 5° to 20° relative to the placement surface.

20. The device as recited in claim 1 wherein the placement surface is planar between the free edges.

* * * * *